United States Patent [19]

Degen et al.

[11] Patent Number: 5,401,523

[45] Date of Patent: * Mar. 28, 1995

[54] PRODUCTION OF STERILE MILK THROUGH DYNAMIC MICROFILTRATION

[75] Inventors: Peter J. Degen, Huntington, N.Y.; Tony Alex, Kendall Park, N.J.; Joseph W. Dehn, Jr., Great Neck, N.Y.

[73] Assignee: Pall Corporation, East Hills, N.Y.

[ * ] Notice: The portion of the term of this patent subsequent to Oct. 26, 2010 has been disclaimed.

[21] Appl. No.: 45,971

[22] Filed: Apr. 9, 1993

Related U.S. Application Data

[63] Continuation-in-part of Ser. No. 901,238, Jun. 19, 1992, Pat. No. 5,256,437.

[51] Int. Cl.⁶ .......................... A23C 7/04; A01J 9/02
[52] U.S. Cl. .......................... 426/580; 426/491; 426/519; 426/522; 210/195.2; 210/636; 210/651; 210/652
[58] Field of Search .............. 426/580, 491, 519, 522; 210/195.2, 652, 651, 636

[56] References Cited

U.S. PATENT DOCUMENTS

| | | | |
|---|---|---|---|
| 3,797,662 | 3/1974 | Titus | 210/781 |
| 3,997,447 | 12/1976 | Breton et al. | 210/360 |
| 4,066,554 | 1/1978 | Guyer | 210/342 |
| 4,093,552 | 6/1978 | Guyer | 210/297 |
| 4,140,806 | 2/1979 | Glimenius et al. | 426/491 |
| 4,427,552 | 1/1984 | Lieberherr et al. | 210/74 |
| 4,559,231 | 12/1985 | Bjerre et al. | 426/42 |
| 4,569,759 | 2/1986 | Ben Aim et al. | 210/304 |
| 4,876,100 | 10/1989 | Holm et al. | 426/491 |
| 4,900,440 | 2/1990 | Ziegler et al. | 210/321.68 |
| 4,956,102 | 9/1990 | Allsing | 210/784 |
| 5,009,781 | 4/1991 | Wynn | 210/739 |
| 5,015,397 | 5/1991 | Joseph | 210/767 |
| 5,028,436 | 7/1991 | Gauri | 426/491 |
| 5,035,799 | 7/1991 | Rosberg et al. | 210/232 |
| 5,037,562 | 8/1991 | Tarves, Jr. | 210/780 |
| 5,047,154 | 9/1991 | Comstock et al. | 210/636 |
| 5,064,674 | 11/1991 | Girsh | 426/580 |
| 5,256,437 | 10/1993 | Degen et al. | 426/580 |

FOREIGN PATENT DOCUMENTS

| | | |
|---|---|---|
| 023072 | 2/1993 | Japan . |
| 380442 | 10/1975 | Sweden . |
| 1451747 | 2/1975 | United Kingdom . |
| 2128464 | 10/1983 | United Kingdom . |
| WO86/01687 | 3/1986 | WIPO . |
| 8601687 | 3/1986 | WIPO . |
| 8803829 | 6/1988 | WIPO . |

OTHER PUBLICATIONS

Journal of Dairy Science, vol. 73, No. 6, 1990, Champaign, Illinois US pp. 1411–1419—F. Kosikowski 'Microfiltration, ultrafiltration, and centrifugation separation and sterilisation process for improving milk and cheese quality'—pp. 1411–1419.

Primary Examiner—Helen Pratt
Attorney, Agent, or Firm—Leydig, Voit & Mayer, Ltd.

[57] ABSTRACT

A method for treating raw milk to produce treated milk having a lower bacterial content than the raw milk. The milk is homogenized and within about 5 minutes from the homogenization, subjected to dynamic microfiltration, to yield a filtrate which has a lower bacterial content than the initial raw milk. The resultant milk can be sterile, free from *Bacillus cereus* bacteria that usually causes degradation of milk quality during refrigerated storage. The milk can be shipped even under non-refrigerated conditions without spoilage, for extended periods of time.

5 Claims, 2 Drawing Sheets

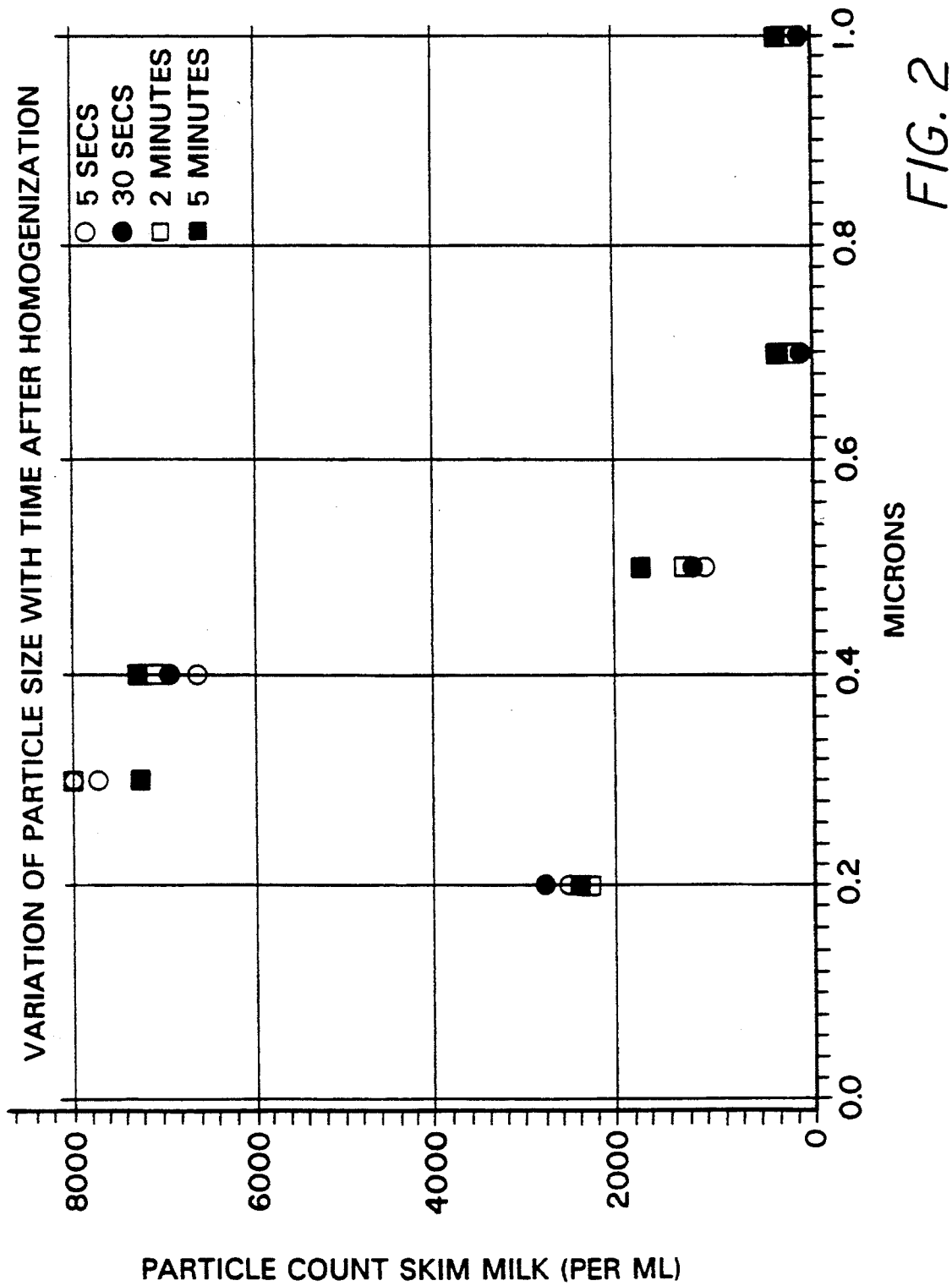

PRODUCTION OF STERILE MILK THROUGH DYNAMIC MICROFILTRATION

CROSS-REFERENCE TO RELATED APPLICATION

This application is a continuation-in-part of U.S. patent application Ser. No. 07/901,238, filed on Jun. 19, 1992, now U.S. Pat. No. 5,256,437.

FIELD OF THE INVENTION

The present invention relates to a method for producing milk, either whole or skim milk, with a lowered bacterial content, the product of said method, and a method for distributing milk to consumers.

BACKGROUND OF THE INVENTION

The well known pasteurization process to kill bacteria in milk has been used for many decades. Unfortunately, the higher temperatures needed in the pasteurization process adversely affect the flavor of the milk. Further, even with the use of such high temperatures, the pasteurization process does not eliminate all undesirable bacteria, leading to the short storage stability of most milk products.

*Bacillus cereus* are often the predominant bacteria in conventionally processed milk of relatively advanced age, because they can survive the pasteurization process and they thrive at cold temperatures, promoting the spoilage of the milk. A general need exists for a method for reducing the content of bacteria in milk, both whole and skim milk, to enhance the storage stability of the product and to improve its flavor by elimination of the pasteurization process.

Of great economic importance, also, is the need to eliminate the very expensive and laborious distribution method that is now necessary to place milk in the hands of the consumer. It is now necessary for every dairy, after processing of the raw milk through homogenization and other steps, to fill the milk into containers for distribution to the consumers and to transport that milk under refrigerated conditions. This requires every dairy to purchase and maintain a significant fleet of refrigerated trucks to transport the processed milk to the point of distribution to the consumer. By providing a sterile or nearly sterile milk product, it would be possible to eliminate the need for transportation of milk under such refrigerated conditions. Unfortunately, the pasteurization process only provides milk with a reduced bacterial count, and not a sterile product.

Further, if a sterile milk product could be produced, it would also be possible to eliminate the need for storing the milk at the point of distribution under refrigerated conditions. Elimination of the need for large refrigerated compartments, as in the typical grocery store, would also be of tremendous economic benefit.

Even when the present day pasteurization process is employed, in some instances it is of particular importance to obtain milk with a lowered bacterial content, prior to pasteurization. For example, a particular batch of raw milk may be so contaminated that mere pasteurization will not result in even adequate storage life by today's standards.

For some applications, moreover, it is of value to be able to provide treated milk in which the bacteria content has been greatly reduced e.g., to about one hundredth of the original value. It is especially important to provide milk with a relatively low bacterial content for the production of cheese, since incorrect bacteria cultures can destroy the cheese. It is normally not suitable to simply heat-treat milk to a sufficient degree for use in cheese production, because such heat treatment may give a lower yield of cheese and can also adversely influence the coagulation time. Conventionally, additives are employed to reduce the problem. In many instances, however, it would be desirable to avoid the use of such additives.

Various methods for producing milk with a lowered bacterial count through the use of filtration have been known in the art, but none have found wide acceptance. The prior art methods generally provide either poor flow rates, rendering the method uneconomical on a large scale, or adversely affect the quality of the milk, making the product unacceptable to consumers.

Conventional filtration means for producing milk with a lowered bacterial content have been attempted. Swedish patent publication No. 380,422 discloses a method in which whole milk is divided into filtrate and concentrate fractions by microfiltration. The filtrate that passes through the pores of the filter (the size of the pores may range broadly from 0.1 micron–10 micron) consists of milk with substantially reduced fat content and the concentrate, which is the fraction retained by the surface of the filter, consists of cream, as not only bacteria, but also fat globules are substantially retained by the filter.

U.S. Pat. No. 5,064,674 relates to a method for making hypoallergenic milk by ultrafiltration methods employing membranes that will allow molecules having a molecular weight of less than or equal to about 5 kDa to pass therethrough. The excluded components that are trapped by the membrane include milk protein, viable or non-viable bacteria, bacterial protein antigen, and milk fat. The filtrate collected from the ultrafiltration process therefor is free not only of bacteria and bacterial protein antigen, but also fat and milk protein, making the product unsuitable for use as milk, per se.

It is clear, then, that the pores of bacteria filters used in the art, which filters are effective to sterilize milk, also will remove not only the bacteria, but also the fat globules, and at least some of the proteins. Such a filter quickly becomes blocked by trapped material; hence, the flow rate through the filter rapidly declines and the filter must be frequently cleaned or replaced. The high cost of such an inefficient process is generally prohibitive. Further, because the filter holds fat globules and proteins, the quality of the milk is also adversely affected.

From the foregoing discussion, it is apparent that there is a continuing need for an improved milk filtration processing method that can provide a sterile, or more nearly sterile product, that has an improved storage life, and does not adversely affect milk quality.

Some attempts have heretofore been made to use cross-flow, or tangential flow, filtration devices to treat milk, such devices being known in the art.

Several types of filtering devices have been described which enable such tangential or crossflow filtration to be accomplished. Perhaps the oldest such apparatus known, described in Soviet Pat. No. 142,626 to Zhevnovatyi, A. I. in 1961, is formed by a tube of porous material fixed inside a second tube, the suspension to be filtered passing under load at high velocity in the annular space between the two tubes, the filtrate flowing within the porous tube. Improved devices of similar construction use two concentric cylinders, with the internal cylinder being formed by a microporous membrane, the liquid being subjected to a forced helicoidal flow around such internal cylinder.

Other crossflow devices comprise a series of filtering elements superposed in the form of plates or disks, on the two faces of which microporous membranes are arranged, for example, around a filtrate-collecting tube, the suspension to be filtered passing between the disks in a helicoidal path one after another.

Many other variations on the crossflow filtration system have been developed. For example, U.S. Pat. No. 5,009,781 relates to a cross-flow filtration device with a filtrate network that includes a number of longitudinal filtrate chambers and one or more filtrate channels which transect the chambers. U.S. Pat. No. 5,035,799 relates to a crossflow filter assembly having filter leaf assemblies arranged in parallel within the filter tank, with pressurized input to create turbulent crossflow of fluid over the media.

U.S. Pat. No. 5,015,397 relates to a crossflow filtration apparatus and process which includes a tube of helically wound wedge wire. Contaminated influent enters at one end and as it flows through the tube, it becomes more concentrated with contaminants, while clarified liquid permeates through the tube wall. U.S. Pat. No. 5,047,154 relates to a method and apparatus for enhancing the flux rate of crossflow filtration systems. U.S. Pat. No. 4,569,759 relates to a tangential filtration apparatus and a plant comprising such an apparatus.

Cross-flow filtration is substantially different from through-flow filtration, in that the liquid feed is introduced parallel to the filter surface, and filtration occurs in a direction perpendicular to the direction of the feed flow. In cross-flow filtration systems, generally, because the direction of the feed flow is tangential to the membrane surface, accumulation of the filtered solids on the filtering medium is reduced by the shearing action of the flow. Cross-flow filtration thus affords the possibility of a quasi-steady state operation with a nearly constant flux when the driving pressure differential is held constant. Unfortunately, this theoretical possibility has not been achieved in practice. Thus, the problem of declining filtration fluxes has plagued conventional cross-flow filtration systems. The majority of the suspended solids are retained on the wall of the tube and quickly form a dynamic membrane (also referred to as a "filter cake" or "sludge layer"). The dynamic membrane is largely responsible for the filtration which subsequently occurs.

Those particles initially entering into the wall matrix ultimately become entrapped within it, because of the irregular and tortuous nature of the pore structure. As microfiltration proceeds, penetration of additional small particles into the wall matrix is inhibited by the presence of the dynamic membrane. The formation of the dynamic membrane, together with the possible clogging of the pore structure of the tube by entrapped particles, results in a decline in the filtration flux. In conventional systems, this decline is approximately exponentially related to filtration time.

Crossflow filtration of milk has been attempted, but has not been generally accepted because of the problems discussed above. U.S. Pat. No. 5,028,436 relates to a process for separating the dissolved and undissolved constituents of milk, using a microporous membrane with a pore size in the range of 0.1 to 2 microns, which has been pretreated with an aqueous solution, dispersion or emulsion of lipids or peptides and the milk separated on the pretreated membrane. In the method of the patent a first filtration step is employed using a microporous membrane in a tangential flow mode. A clear filtrate and a thickly flowing concentrate are obtained. The filtrate contains all salts, lactose, amino acids, oligopeptides and poly-peptides of low molecular weights in genuine, non-denatured form and the concentrate contains practically all casein and fatty components of the milk. Thus, the filtrate cannot be considered to be "milk" as the fatty substances have all been removed therefrom.

U.S. Pat. No. 4,876,100 relates to a crossflow filtration method for producing milk with a lowered bacterial content. Raw milk is divided by centrifugal separation into one fraction consisting of cream and another fraction consisting of skim milk. The skim milk fraction is directed into a microfilter in which part of the fat globules, protein, and bacteria are separated. From the microfilter there is obtained a filtrate which consists of skim milk having a lowered fat, protein and bacterial content, and a concentrate having an increased fat, protein and bacterial content. The concentrate is subsequently sterilized. Thus, the filtration method of the '100 patent, besides reducing bacterial levels in the filtrate, also reduces the fat and protein content of the filtrate, altering its characteristics from that of the original skim milk.

Clearly, the use of crossflow filtration, to date, has not provided an acceptable method for reducing bacterial contamination in milk.

One means to overcome some of the problems associated with classical crossflow filtration technology, known as dynamic microfiltration, has emerged. The dynamic filtration process overcomes the disadvantage in the classical crossflow technology because the liquid to be filtered is not simply guided tangentially over the membrane surface. The membrane surface or a solid body near the membrane surface is moved such that the fluid at the interface between the rotor and the stator is subjected to shearing action. The shearing action tends to "scrub" the membrane surface, keeping it relatively clear of particulate material, and preventing a filter cake from forming on the membrane surface. The particulate material that would otherwise collect on the membrane surface remains suspended, and is ultimately removed in the secondary stream, generally referred to as a concentrate stream.

Dynamic microfiltration systems may take various forms. For example, U.S. Pat. Nos. 5,037,562, 3,997,447, 5,037,562, 3,997,447 and 4,956,102 relate to dynamic microfiltration disc systems.

Cylindrical dynamic microfilters devices are taught in U.S. Pat. Nos. 4,956,102; 4,900,440; 4,427,552; 4,093,552; 4,066,554; and 3,797,662, as well as many others. All patents referenced in the present application are incorporated herein by reference.

No one has ever applied dynamic microfiltration to the processing of milk, and the use of crossflow filtration of milk has been limited, and principally used to fractionate milk into components based upon fat content.

SUMMARY OF THE INVENTION

It has now been surprisingly discovered that dynamic microfiltration of milk can be successfully accomplished, without the prior art problems of degradation of milk quality, premature filter plugging, and inadequate bacterial removal, through the practice of the method of the present invention.

In accordance with the present invention milk, either whole or skim milk, is first homogenized and then subjected to filtration. By performing the homogenization step first, the particle size of the fat globules and other large, suspended components of the milk is significantly reduced, allowing for microfiltration of the milk without significant removal and entrainment of the fat and other components.

Milk is an emulsion of fat and protein particles in water. Homogenization provides for a method of reducing the emulsion particle size to allow passage through an appropriately sized microporous membrane, to retain bacteria contained therein without unwanted removal of the fat and protein content of the milk.

The milk, after homogenization, is filtered through the use of dynamic microfiltration. The invention thus provides an improved method for producing milk with a lowered bacterial content, without the need for pasteurization. That portion of the milk fraction that is retained by the microfilter (the concentrate fraction), may be recirculated as part of the feed, or may be discarded or used in other processes.

Thus, in one aspect, the present invention provides a method for treating raw milk to produce treated milk having a lower bacterial content than the raw milk. The method comprises homogenizing the milk and within about 5 minutes from the homogenization, subjecting the milk to dynamic microfiltration by passing the milk through a microfilter having an average pore size sufficient to reduce the bacterial content of the milk flowing therethrough, to yield a filtrate which has a lower bacterial content than the initial raw milk and a concentrate having a higher bacterial content than the initial raw milk. The resulting milk has a very low bacterial content, such as about $10^3$ bacteria per milliliter, or less, and retains more organoleptic components than that found in pasteurized milk with the same bacterial content.

The milk that may be obtained as a result of the process of the present invention, in general, is more storage stable than milk obtained as a result of conventional pasteurization. Significant residual bacteria remains in milk, after pasteurization, because milk naturally contains certain bacteria, which also survive the pasteurization process. Thus, pasteurized milk still must be refrigerated to reduce bacterial growth and spoilage. Unfortunately, some of the bacteria present in raw milk are both thermoduric (bacteria that survive pasteurization) and psychrotrophic (bacteria that thrive at low temperatures, below 15° C.) such as *Bacillus cereus*. The presence of thermoduric, psychrotrophic bacteria in the packaged milk product is very detrimental, as their rapid growth, even under refrigerated conditions, results in the spoilage of the milk. The present invention is capable of producing sterile milk, which may be stored even at room temperature for extended periods of time, such as for 30 days or more. The sterile milk of the present invention may be characterized by the absence of bacteria, generally, and in particular by the absence of bacteria and pathogens such as the following:

| Thermoduric Bacteria | |
| --- | --- |
| Micrococus | *M. luteus, M. roseus* |
| Streptococcus | *S. pneumoniae, S. lactis, S. faecalis* |
| Lactobacillus | *L. delbrueckii, L. lactis, L. helveticus, L. casei,* |

-continued

| | *L. trichodes* |
| --- | --- |
| Staphylococus | *S. aureus, S. epidermidis* |
| Bacillus | *B. cereus, B. subtilis, B. macerans, B. stearothermophilus* |
| Clostridium | *C. butyrium, C. pasteurianum, C. botulinum, C. perfringens, C. tetani* |
| Psychrotrophic Bacteria | |
| Psuedomonas | *P. aeruginosa, P. fluorescens, P. pseudomallei, P. mallei* |
| Archnomobacter | |
| Alcaligenes | |
| Acientobacter | *A. lignieressii, A. equirli* |
| Flavobacterium | *F. aquatile, F. menigosepticum* |
| Bacillus | *B. cereus, B. subtilis, B. macerans, B. stearothermophilus* |
| Coliform Bacteria | |
| Enterobacter | *E. coli, Salmonella Typhi, Shigella Dysenteriae, Klebsiella Pneumoniae* |
| Miscellaneous | |
| Listeria | *L. monocytogenes* |

Thus, the milk of the present invention will be capable of meeting and typically exceeding the requirement for Grade A pasteurized milk which requires the milk not to exceed a bacterial plate count of 30,000 per milliliter, and a coliform count exceeding 10 per milliliter, as determined by standard methodology.

In another embodiment the present invention provides a method for treating raw milk to produce treated milk having a lower bacterial content than the raw milk, comprising (1) separating said milk into a fat fraction with a minimum fat content of about 10% and a skim milk fraction, (2) homogenizing the skim milk fraction and within about 5 minutes from the homogenization, subjecting the skim milk fraction to dynamic microfiltration by passing the skim milk fraction through a microfilter having an average pore size sufficient to reduce the bacterial content of the milk flowing therethrough, to yield a filtrate which has a lower bacterial content than the initial skim milk fraction and a concentrate having a higher bacterial content than the initial skim milk fraction, (3) separately reducing the bacterial content of the fat fraction, and (4) subsequently combining the skim milk fraction after microfiltration and the fat fraction having the lowered bacterial content.

In a further embodiment, the present invention provides a method for making milk having a fat content of about 2%, comprising (1) homogenizing a skim milk fraction and within about 5 minutes from the homogenization, (2) subjecting the skim milk fraction to dynamic microfiltration by passing the skim milk fraction through a microfilter having an average pore size sufficient to reduce the bacterial content of the milk flowing therethrough, to yield a filtrate which has a lower bacterial content than the initial skim milk fraction and a concentrate having a higher bacterial content than the initial skim milk fraction, (3) reducing the bacterial content of a cream fraction having a minimum fat content of about 10%, and (4) subsequently combining the skim milk fraction after microfiltration and the cream fraction having the lowered bacterial content.

The present invention also provides a method for processing milk for consumption by a consumer, comprising obtaining raw milk, homogenizing the milk and within about 5 minutes from the homogenization, subjecting the milk to dynamic cross-flow microfiltration by passing the milk through a microfilter having an average pore diameter sufficient to reduce the bacterial content of the milk flowing therethrough, to yield a filtrate which has a lower bacterial content than the initial raw milk, packaging the milk into a container for use by the consumer, and transporting the milk, without refrigeration, to a point for distribution to the consumer.

Most generally, then, the present invention provides a method for distributing milk for consumption by a consumer, comprising obtaining raw milk, reducing the bacterial content of the milk to a level of $10^3$ bacteria per milliliter or below, packaging the milk into a container for use by the consumer, and transporting the milk, without refrigeration, to a point for distribution to the consumer. This eliminates the need for refrigerated transportation and delivery vehicles.

BRIEF DESCRIPTION OF THE DRAWINGS

FIG. 2 is a plot of the particle sizes in milk after homogenization.

DESCRIPTION OF THE PREFERRED EMBODIMENTS

Figure 1:
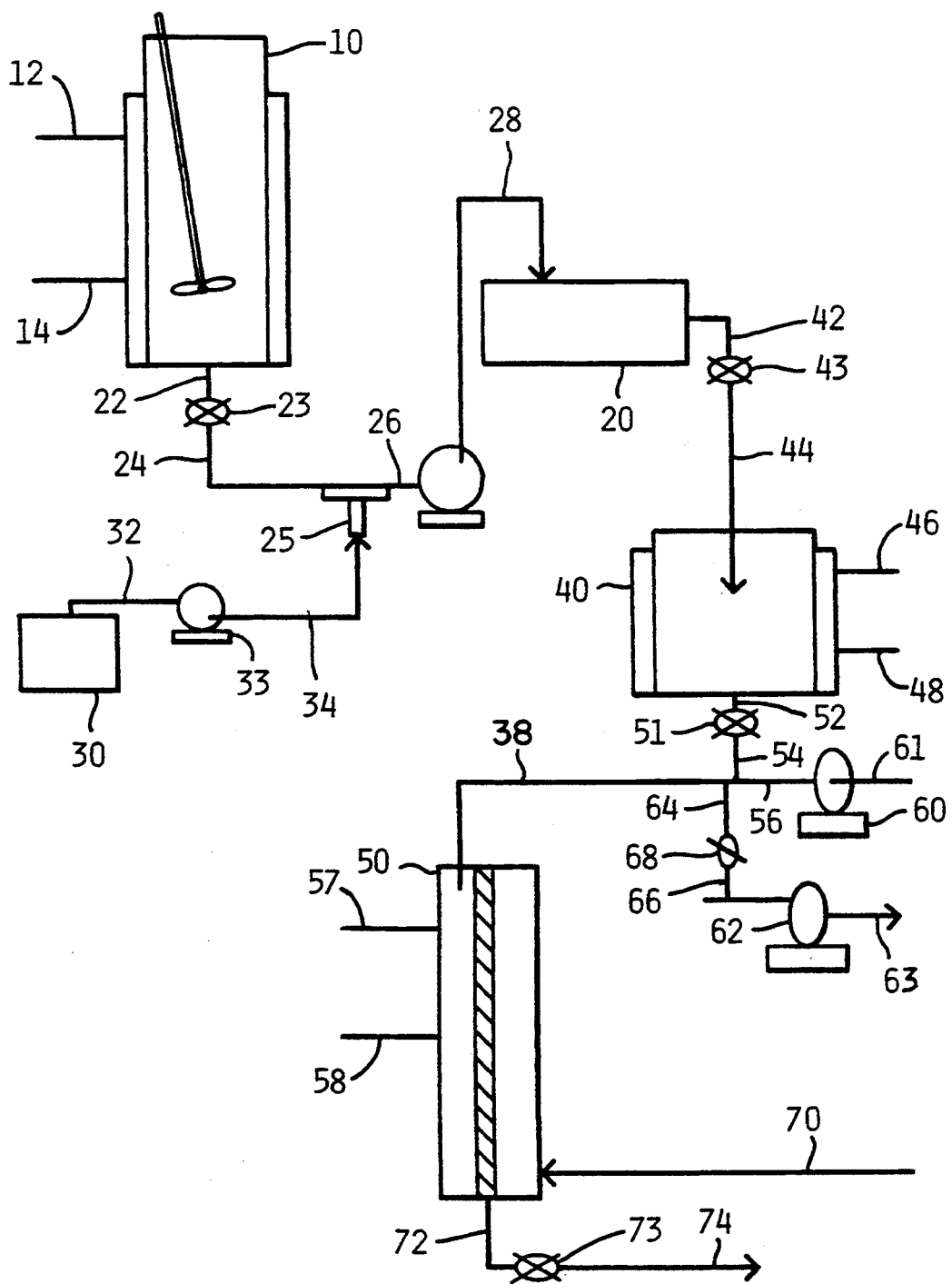
FIG. 1 is a schematic diagram of the equipment employed in accordance with the method of the present invention.

The equipment used in the present invention is illustrated in FIG. 1. In that Figure, a jacketed process vessel 10 has connected thereto heating/cooling lines 12 and 14. The interior of the process vessel 10 is in fluid communication with homogenizer 20 via conduits 22, 24, 26 and 28. Conduit 22 is in fluid communication with the interior of vessel 10 and valve 23, which is in fluid communication with T-connector 25. T-connector 25 is then in communication with conduit 26, which communicates with pump 27. Homogenizer 20 communicates with pump 26 via conduit 28. T-connector 26 is also in communication with bacteria supply 30, which supplies bacteria via conduits 32 and 34 with the aid of pump 33 which is located between conduits 32 and 34 and is in fluid communication therewith.

Homogenizer 20 is in fluid communication with the interior of surge tank 40 via conduits 42 and 44. Valve 43 is located between said conduits and also is in fluid communication therewith. Surge tank 40 is also connected to heating/cooling lines 46 and 48.

The interior of surge tank 40 is in fluid communication with conduit 52 that communicates with valve 51, which, in turn, is in communication with conduit 54. Conduit 54, then communicates with conduit 56, which is connected to both dynamic microfilter 50 and synchronized pump 60. Synchronized pump 60 is in communication with synchronized pump 62 via conduits 64 and 66 and control valve 68 is located therebetween. Retentate exits pumps 60 and 62 via conduits 61 and 62, respectively.

Filter 50 is also connected to heating/cooling lines 57 and 58. The interior of filter 50 is supplied with feed via conduit 70 and permeate exits the filter 50 via conduits 72 and 74, which has valve 73 located therebetween.

The initial material is fresh, untreated raw milk, as from a domestic animal, such as a cow. The method of the present invention may also be applied to processed milk, such as that already subjected to pasteurization, but the full advantages will not be realized, such as the production of milk with improved organoleptic properties, when compared to milk that has not been pasteurized.

The raw milk to be processed may first be directed through a heat exchanger to adjust it to a suitable temperature, and if desired, then passed through a centrifugal separator, to remove all or a portion of the cream fraction in a conventional manner.

As an overview, the raw milk is homogenized and reasonably promptly passed through a dynamic microfilter, yielding a filtrate fraction and a concentrate fraction. The pores in the microfilter are sized to retain at least a portion of the bacteria. The filtrate, which is the portion of the milk fraction that passes through the retaining surface of the microfilter, consists of milk with no, or a lowered, bacterial content (relative to the milk before microfiltration), with essentially no change in the fat and protein content. The filtrate fraction may then be used directly to make other products, such as powdered milk, or packaged without further treatment.

The filtrate fraction is more desirable than the milk obtained by conventional pasteurization, for many reasons. It retains more organoleptic components than milk that has been pasteurized, making it more flavorful and desirable from the standpoint of the consumer. Further, the milk obtained in accordance with the present invention has a much greater storage life, because bacteria, such as the psychrophilic bacteria, especially *Bacillus cereus*, can be completely removed by the present invention, an impossibility using conventional pasteurization.

The concentrate fraction, which is the portion of the milk fraction that is retained by and recovered from the retaining membrane surface of the microfilter, consists of milk with an increased bacterial content (relative to the milk feed prior to microfiltration) and essentially no change in fat globular and protein content. The concentrate fraction subsequently may be discarded or used in other processes.

The filtrate may contain some bacteria, but the lower the bacterial content, the more storage-stable the product. Full sterilization is desirable, but the initial growth rate of a small remaining concentration of bacteria is usually low enough to still result in greatly increased storage life of the resultant milk product.

The storage life of milk produced according to the method of this invention is substantially increased over that for conventionally-pasteurized milk because the concentration of *Bacillus cereus* bacteria, in particular, is greatly reduced.

Because the milk of the present invention may be rendered sterile, whereas milk obtained by use of conventional pasteurization techniques cannot be truly sterile, the milk may have extremely long storage life under refrigerated or room temperature conditions, especially if the milk is placed into a container under aseptic conditions. One means to do this is by use of the form-fill-seal technique that is now well known in the packaging industry. This technique is often used for packaging sterile solutions and the like, as for the pharmaceutical industry. The milk made in accordance with the present invention may be packaged using the form-fill-seal technique, and such milk may exhibit extremely long storage life, even at room temperature.

The exact method or machinery used to accomplish the filling is not critical. As merely one example and explanation as to how such a form-fill-seal technique can be employed, the following description is provided.

Some vertical form, fill and seal machines use a flat web of synthetic thermoplastic film which is unwound from a roll and formed into a continuous tube, in a tube forming section, by sealing the longitudinal edges of the film together. In other machines the tube is extruded from a resin melt at the time of use. The tube thus formed is advanced to a filling station where it is collapsed across a transverse cross-section, the position of the cross-section being at a sealing device below the filling station. A transverse heat seal is made, by the sealing device, at the collapsed portion of the tube, thus making an airtight seal across the tube. After making the transverse seal, a quantity of material to be packaged, e.g. liquid, is caused to enter the tube, at the filling station, and fill the tube upwardly from the aforementioned transverse seal. The tube is then caused to move downwardly a predetermined distance and sealed and severed transversely at the second transverse section.

One such vertical form, fill and seal machine of the type described above is sold under the trade mark PRE-PAC, and another is disclosed in U.S. Pat. No. 5,038,550.

Homogenization

The milk fraction is first preferably heated or cooled, after centrifugal separation, if employed and prior to homogenization, to a suitable temperature for homogenization. The milk is then passed into a homogenizer where the fat emulsion size is reduced to a size sufficient to allow passage through the membrane. Preferably, the size of all suspended particles is less than about 1 micron. It is important that the milk, after homogenization, be filtered relatively soon thereafter. Preferably, the filtration will be in less than about 5 minutes, preferably less than about 2 minutes, and most preferably in less than about 30 seconds.

Again, the important factor is not the holding time prior to filtration, but rather the fact that filtration occurs prior to any substantial agglomeration of globules, forming a substantial number of particles larger than about 1 micron.

Homogenization of skim or whole milk prior to filtration in a cylindrical, dynamic microfiltration unit is absolutely necessary in order to properly emulsify and suspend the fat constituents and other components of the milk and reduce the size sufficiently, and thus achieve proper filtration. A rotating disc filter, however, develops a significant shear rate immediately at the surface of the rotating disc. Hence, some degree of homogenization of the milk can occur essentially instantaneously with filtration. Such "self" emulsifying of the milk by the action of the dynamic microfilter allows skim milk to be processed by a rotating disc filter without the need for a separate homogenizer.

In effect, the rotating disc environment acts to both homogenize and concurrently filter the milk, which is not accomplished in a rotating cylindrical filter unit. A rotating disc filter may generate a shear rate of about 200,000 sec$^{-1}$ whereas a rotating cylindrical unit may generate a shear rate of only 10,000 sec$^{-1}$. Although the shear force is substantial in a rotating disc filter unit, it is not believed that it will be, in most instances, sufficient to adequately homogenize whole milk.

Dynamic Filtration

In the present invention the filtration is performed as a dynamic filtration, that is the filtration medium itself is kept in constant motion so that the effective flow rate of milk across the medium is extremely high. The particular physical form of the dynamic membrane is not critical. Thus, the membrane medium may take the form of discs or cylinders, for example. Such dynamic microfiltration devices have been discussed previously and are suitable in the practice of the present invention. In general, the dynamic microfilter comprises a cylindrical or disc membrane element that spins inside an outer impermeable cylinder. In a cylindrical dynamic microfilter, when the fluid to be filtered is introduced into the gap between the stator and the rotating membrane, momentum from the spinning membrane is imparted to the fluid. The fluid near the inner cylinder experiences a higher centrifugal force than the fluid near the outer cylinder. This phenomena, under certain conditions, generates a flow pattern that is known as Taylor vortices, which phenomena prevents the development of substantial residue on the membrane surface.

The dynamic filtration process, then, takes advantage of the generation of the Taylor vortices to keep the surface of the membrane free of potential residue, the constituents of which then remain suspended in the fluid being filtered. The process then splits the feed into a filtrate (the portion of fluid that permeates through the membrane) and a concentrate (the fraction that contains the suspended particles that normally would have deposited on the surface of the membrane, plugging the same). In such a manner, a high flux rate through the membrane can be maintained for a long period of time. The amount of feed and concentrate must be controlled in a fashion that results in a stable fluid flow. Even with low flow rates of concentrate, it is possible to maintain a stable flow of fluid to the surface of the membrane.

The dynamic microfiltration allows for a wide range of effective surface velocities for the filtration medium relative to the milk feed. For example, an effective surface velocity of from about 3 m/sec to about 50 m/sec is usable, especially from about 5 m/sec to about 30 m/sec, most preferably from about 8 m/sec to about 20 m/sec.

To achieve the desired surface velocities a representative filtration medium in the form of a cylinder with a diameter of about 2.5 inches will need to be rotated at a rate of about 1,000 to about 6,000 revolutions per minute (rpm) with a rate of about 5,000 rpm being typical.

If a dynamic disc filtration device is employed, a typical disc filtration medium will have dimensions of about 2 inches to about 48 inches, in diameter. Such discs may, for example, be rotated at speeds from about 1,000 rpm to about 8,000 rpm, typically from about 3,000 rpm to about 6,000 rpm, depending upon the design of the particular dynamic microfilter that is employed. Preferably the shear rates of such disc filters will be from about 100,000 sec$^{-1}$ to about 400,000 sec$^{-1}$. Among the preferred disc filters are those of the type disclosed in copending U.S. patent application Ser. No. 07/812,123, filed on Dec. 24, 1991, the specification of which is incorporated herein by reference.

The microfilter pores are sized so as to retain the bacteria that are present in the milk while still maintaining an acceptable flow rate through the microfilter. Useful membranes include hydrophilic microporous membranes with good flow properties, narrow pore size distribution and consistent bacterial removal performance for the bacteria of interest. The pore size rating of the microfilter membrane should be from about 0.01 to about 5.0 microns, as determined by those methods known in the art, the tests known as the "bubble point"

(ASTM F316-86) and the $K_L$ method (U.S. Pat. No. 4,340,479). Preferably, the pore size rating will be from about 0.1 to about 1 micron. Most preferably, filters are employed that have pore size ratings from about 0.2 to about 0.5 micron. Such microporous filters are well known and are readily available.

Preferred microporous membranes that may be used in accordance with the present invention include those sold by Pall Corporation under the trademarks Ultipor N66 ®, Fluorodyne ®, and Posidyne ®; those available from Cuno Corporation under the trademark Zetapor, and those sold by Millipore under the trademark Durapore ®.

The cylindrical membrane elements of use in the present invention include those that may be attached to a support in a leak-tight manner, in accordance with methods known in the art.

Ultimately, the bacteria should be concentrated into a stream that is less than about 5% of the feed and greater than about 95% of the solids and proteins normally found in the milk should pass through the membrane, for extended periods of time.

The dynamic microfilter can be operated single pass without the necessity of recycling the concentrate. If desired the concentrate can be recycled to the feed. When a cylindrical dynamic microfilter is employed, it can be operated at various ratios of filtrate flow to the total feed flow (concentration factors). However, the cylindrical dynamic microfilter is advantageously operated at filtrate to feed ratios of above 90%, especially about 95%, and particularly above 98% in order to produce predominately the very low bacteria content filtrate as the desired product.

Similarly, when a rotary disc dynamic microfilter is employed, it also can be operated at various ratios of filtrate flow to the total feed flow. However, the rotary disc dynamic microfilter may be operated at filtrate to feed ratios over a wide range. Selecting a high ratio will simply lower the throughout, whereas operation at a low ratio will result in a higher throughput. It is believed that operation at a ratio of about 40% is advantageous in order to maintain a stable flow rate through the filter, although other ratios may be employed.

The filtration of the freshly homogenized milk may be done warm at 40° C. to 60° C., which is at or somewhat above the crystallization temperature of about 40° C. of the higher melting components of milk fat. This is below the temperatures employed in conventional thermal pasteurization. Alternatively, with some degradation in flow rate, the milk may be filtered at much lower temperatures, such as from about 15° to about 35° C., particularly from about 20° to about 25° C.

General

After microfiltration, the concentrate may be discarded in any acceptable manner, subjected to further processing, or used directly.

The method of this invention may be used to advantage where the desired end product is either whole milk, standardized milk, or skim milk.

The flux rates through a bacterially retentive membrane, of milk with a lowered fat content, are normally higher than the flux rates of milk with a high fat content. In certain situations it is economically more advantageous to produce a milk with a higher fat content, such as 2% fat milk, by combining a filtered skim milk with a filtered fat fraction. This fat fraction can be a cream fraction with a minimum fat content of about 10%.

Filtration of the cream fraction can occur, for example, with the use of a dead end bacterially retentive filtration cartridge. The filtration can be carried out in an industrially acceptable manner by heating the fat composition to a point where it is in a liquid state and is easily filtered through a micorporous membrane. The preheated fat may be homogenized prior to filtration. Alternatively, the fat composition can be subjected to pasteurization to lower its bacterial content, or a combination of pasteurization and microfiltration may be used.

Further, if the object of the process is to obtain protein concentrates, as from the milk of a transgenic animal such as a transgenic cow, the dynamic microfiltration is operated to achieve a high concentration of concentrate, using a microporous membrane with a pore size rating of about 0.2 microns, or lower.

Suitable apparatus for carrying out the method of the invention can be constructed by interconnecting conventional equipment including centrifugal separators, microfilters, sterilization units, heat exchangers and pumps. Those skilled in the art will readily be able to provide valves for flow and pressure control and other necessary support equipment to make such apparatus operable, and to then make further conventional modifications to such apparatus as needed in particular cases.

All references discussed hereinabove are incorporated herein by reference.

The examples below further illustrate particular embodiments, but in no way are intended to limit the scope of the invention, which is defined in the claims.

General Procedure

For the examples, the general procedures employed were as follows.

Method A: Temperature Adjustment of Milk

Unless otherwise indicated, the milk employed in the following examples was commercial milk, obtained from a retail outlet. The temperature of the milk was adjusted to a suitable process temperature, prior to filtration. The preferred operating temperature (40°-60° C.) was used because the majority of the fats in milk are not in a crystallized form at such temperatures. A 35 liter jacketed fermenter vessel (Type 3000 from Chemap A. G.) served as the process vessel. The vessel was filled with milk and the contents were heated to about 50° C., unless otherwise noted, via a hot water jacket. The milk was stirred during the heating process to enhance heat transfer.

Once the milk attained the desired process temperature, the milk was pumped to a homogenizer at the rate of about 1 liter/min.

Method B: Homogenization of Milk

Upon entering the homogenizer (Model 15 MR from APV Gaulin, Inc.) the milk underwent a two-stage homogenization process, the first of which was at about 2500 psi and the second at about 500 psi. Normal procedures of startup and operation were followed as outlined in the APV Gaulin operating manual for this unit. Typically, after homogenization, the milk was transferred to an intermediate surge tank which was jacketed and maintained at the desired process temperature. This tank functioned as a fluid buffer between the homogenizer outlet and the feed to the filter. Whenever desired, the homogenized milk could be recycled through the homogenizer to maintain a constant volume in the surge tank.

Method C: Introduction of Bacteria into the Milk Feed Stream

In some experiments artificial seeding of the milk stream with bacteria was used to demonstrate the very high titer reduction possible with the present invention. Bacteria inoculate was added to the feed stream via a metering pump, between the process vessel and the homogenizer. The inoculate flow rate was maintained such that a desired concentration level of bacteria of about $10^6$ bacteria per milliliter of milk was achieved. Since the bacteria was introduced prior to the homogenizer, the bacteria was well mixed in the process fluid prior to entering the filtration device. Most of the examples used *E. coli* strain ATCC 15224.

An alternate method of seeding the milk with bacteria would be by the addition of the bacteria directly into the process vessel at the desired concentration. Such a method is not preferred because it exposes the bacteria to long residence times in temperatures greater than ambient. This could cause unwanted growth or excessive killing of the bacteria before entering the filtration device, depending on the strain being used.

Method D: Bacterial Assay Tests

Mesophiles: Bacterial concentration was determined by serial dilution of the samples and passing the appropriate dilutions through sterile 0.2 micron membranes and culturing on Mueller-Hinton Agar for 24 hours at 32° C. These procedures are detailed in a publication entitled "Manual of Clinical Microbiology, 2nd Edition, 1974, ASM, Washington, D.C."

*Listeria monocytogenes* ATCC 43256 was the pathogen tested. The population levels in the samples were determined by the method used by Agello et. al. (Agello, G., Hayes, P. and Feeley, *J. Abstracts of the Annual Meeting,* 1986, ASM, Washington D.C., p5.)

Method E: Cleaning Procedure

Sanitization and sterilization were conducted prior to every experiment using 0.1N sodium hydroxide. In the sterilization process, the membrane and all of the associated equipment were first flushed with water and subsequently treated with 0.1N sodium hydroxide at 50° C. for approximately half hour. The caustic solution was then neutralized using phosphoric acid. This neutralized solution was then used to flush the system until all portions were neutral. Filtration tests were conducted immediately after this procedure. The entire equipment and membrane elements were sanitized using the sterilization procedure upon conclusion of each test.

Method F: Integrity Testing

Each membrane element was tested for integrity prior to bacterial challenge. A forward flow test as described in publication NM 900a, 'The Pall Ultipor membrane filter guide', copyright 1980, available from Pall Corporation, was used for the integrity test.

Description of Filtration Apparatus

1. The cylindrical dynamic microfilter

The cylindrical dynamic microfilter (cylindrical DMF) used for these tests was a BDF-01 manufactured by Sulzer Brothers Limited, Winterthur, Switzerland. The equipment is described by Rebsamen et. al. (Dynamic Microfiltration and Ultrafiltration in Biotechnology, Rebsamen, E. and Zeigler, H., Proceedings of the World Filtration Congress IV, 1986, (Ostend, B)). See also, U.S. Pat. Nos. 4,066,554 and 4,093,552, which are incorporated herein by reference.

2. Description of membrane filter elements

The membrane filter elements used in these experiments typically were various grades of nylon membrane, Ultipor $N_{66}$® and Posidyne®, commercially available from Pall Corporation, Glen Cove, N.Y. The pore sizes used were 0.2, 0.30, 0.45 and 0.65 microns. The membrane elements had a surface area of 0.04 $m^2$.

3. The dynamic microfilter in disc format:

The disc format consists of a six inch diameter membrane support disc mounted on a hollow shaft and contained within a leak-tight housing, with required fluid inlet and outlet connections. The support disc had provisions for sealing membrane sheets to its face in a leak-tight manner and contained drainage spaces to carry filtrate flow through the membrane and disc, and out through the shaft. Effective membrane area was 0.014 $m^2$ and rotation rates up to 4500 rpm were available.

Any of the dynamic disc microfiltration units discussed previously may be employed in the practice of the present invention. Reference is also made to U.S. patent application Ser. No. 07/812,123, filed on Dec. 24, 1991, for description of another dynamic microfiltration device in disc format that may be used in the practice of the present invention.

4. Description of membrane filter elements

The membrane filter elements were the same grades of membrane described in the section under the cylindrical DMF. Typically, the membranes were circular flat sheet "donuts," cut to fit the disc DMF. When assembled in the dynamic microfilter, the filtrate chamber was sealed from the feed with the use of o-rings. The membrane filter elements had a surface area of 0.014 $m^2$.

Method G1: Operation of the Cylindrical Dynamic Microfilter

Prior to filtration, a filter element, as described in the section under filter assemblies, was assembled in the cylindrical dynamic microfilter (DMF). Sanitization and sterilization was conducted using the procedure outlined in method E. After observing the startup procedures outlined in method G2, the milk to be filtered was pumped from the surge tank into the cylindrical DMF via a positive displacement pump. The amount of concentrate was controlled by a second pump or pressure relief valve attached on the concentrate port. Temperatures and flow rates of the feed, filtrate and concentrate, and the feed pressures were taken at various times during the course of the experiment, typically, in intervals of ten minutes. Standard operating conditions of the cylindrical DMF were a rotation speed of 5000 rpm, filtrate to feed ratio of greater than 95%, and a feed pressure of about 1.3–2.0 bar. All examples with this device were carried out at constant feed flow rates.

Method G2: Startup of the Dynamic Filter

Prior to introducing the milk into the dynamic filter, warm, deionized, 0.2 micron filtered water was passed through the system to startup the associated equipment. The rotational speed of the dynamic filters was brought up to operational speed with water flowing through the system. When the system had reached an equilibrium, the flow of milk was turned on. The milk displaced the water in the system and the filtration commenced.

Method H: Operation of the Disc Dynamic Microfilter

A disc DMF filler element described in the section under filter assemblies was assembled in the disc DMF. Sanitization and sterilization was conducted using the procedure outlined in method E. After observing the startup procedures outlined in method G2, the milk to be filtered was pumped from the surge tank into the disc DMF. The amount of concentrate and feed pressure was controlled by a valve placed on the concentrate port. Temperatures and flow rates of the feed, filtrate and concentrate, and the feed pressures were measured at various times during the course of the experiment, typically, in intervals of ten minutes. A feed rate of about 960 ml/min was maintained for all examples. The filtrate fluxes reported are those acquired when the flow had stabilized in the filtration unit.

EXAMPLES

Example One

Room temperature skim milk was pumped at the rate of about 600 ml/min into a cylindrical DMF, equipped with a 0.45 micron Ultipor $N_{66}$® membrane. The operating conditions in the DMF were maintained as specified by method G1, and are summarized in Table I. The feed pressure started to rise rapidly a few minutes after the start of the test, indicating plugging of the microporous membrane.

Example Two

Skim milk was heated to 50° C. according to method A and homogenized by method B. The homogenized milk was then stored in the surge tank for about four hours while the temperature of milk was maintained at about 50° C. for this duration. After this four hour lag period the milk was pumped into a cylindrical DMF equipped with a 0.45 micron Ultipor $N_{66}$® membrane, at a feed rate of about 600 ml/min. The preferred conditions of DMF operation as outlined in method G1 were maintained. The feed pressure started to rise rapidly after only a few minutes of operation, indicating plugging of the microporous membrane and the test had to be terminated.

Example Three

Skim milk, heated to 50° C. according to method A and homogenized by method B, was pumped into a cylindrical DMF, equipped with a 0.45 micron Ultipor $N_{66}$® membrane, within no more than five minutes of homogenization. The preferred conditions of DMF operation, as outlined in method G1 were maintained. A stable filtrate flux of 1080 L/hr/m² was obtained until the milk supply was exhausted. No increases in feed pressure were observed during the course of the experiment.

When all the milk had been processed the feed was switched to unhomogenized skim milk at 50° C., without disturbing system operation. Within a few minutes, milk filtrate flux decreased rapidly and the system pressure rose, indicating that plugging of the membrane had taken place. This example clearly shows the need to homogenize milk to achieve significant flow through a microfiltration membrane.

Examples 1–3 show that it is necessary to impart sufficient shear on milk (via homogenization in this case), prior to filtration, to reduce the emulsion particle size of the milk sufficiently to allow passage through the microporous membrane and thus achieve proper filtration. Example 2, in particular, indicates that the particle size distribution reverts to larger sizes within a short period of time after homogenization. Hence, for proper filtration, the homogenization must be within some short period of time prior to filtration, such as within less than 5 minutes or preferably shorter intervals.

Example Four

Skim milk was preheated by method A and pumped into a disc DMF equipped with a 0.45 micron Ultipor $N_{66}$® membrane. The procedures outlined in method H were employed. A steady flux of filtrate was established quickly and was maintained for about 100 minutes until the milk supply was exhausted.

The disc DMF operating conditions produce a calculated shear rate of about 200,000 sec$^{-1}$ at the interface gap between the rotating disc and the membrane. This shear is in the range of shear rates generated by the homogenizer by the conditions in method B.

This example demonstrates that the required shear, prior to filtration, can be achieved in one step, i.e., without the need for separate homogenization equipment. The example clearly demonstrated that the membrane was not being fouled by the solids in milk and that the shear generated by the rotation of the disc, about 200,000 sec$^{-1}$, was sufficient to reduce the particle size in skim milk to allow passage through a microfilter membrane, and thus achieve proper filtration.

Table 1 summarizes the results of examples one through four; the data shows that a steady state filtrate flux through the membrane is achieved when sufficient shear is imparted to the milk within a short time prior to filtration.

TABLE 1

| Example 1 | Filtration Mode | Feed Temp. °C. | Shear in filter sec$^{-1}$ | Homogenization | Lag after Homogenization | Pore size microns | Flux L/hr/m² |
| --- | --- | --- | --- | --- | --- | --- | --- |
| 1 | cylinder | 25 | 10,000 | NO | NO | 0.45 | 0 |
| 2 | cylinder | 50 | 10,000 | YES | 4 hours | 0.45 | 0 |
| 3 | cylinder | 50 | 10,000 | YES | 5 minutes | 0.45 | 1080 |
| 4 | disc | 50 | 200,000 | NO | — | 0.45 | 1600 |

Example Five

In order to determine the relationship between particle size and time after homogenization, skim milk was heated by method A and homogenized using the procedure outlined in method B. The particle size distribution with respect to time after homogenization was determined. The particle size distribution was measured using an Integrated Micro-Optical Liquid Volumetric Sensor (IMOLV-.2), available from Particle Measurement Systems, Colorado. This laser particle counter is designed to measure particle size distribution in the range of about 0.1 to 5.0 microns.

The milk samples were diluted 1:300,000 and then subjected to analysis as specified by the operating manual for the IMOLV device. 0.04 micron filtered, 18 mega-ohm DI water, with particle counts less than 50 per milliliter was used for diluting the milk samples.

FIG. 2 shows the results of the particle analysis. A plot of number of particles relative to the number of particles at 5 seconds vs. particle size is shown in the figure. Clearly, the figure demonstrates that as the period of time after homogenization increases, the number of larger particles increases. As the number of smaller particles commensurately decrease over that period, it is apparent the smaller particles agglomerate, with the passage of time, to form the larger particles.

Examples Six to Nine

Membranes of various pore sizes and bacterial retentive properties were tested on the cylindrical DMF to determine the magnitude of the steady filtrate flux of milk which could be achieved. The general method used for examples six through nine are given below.
1. The desired membrane filter element was assembled in the cylindrical DMF.
2. An integrity test as outlined in method F was conducted. The membrane filter element was rejected if it did not pass the test.
3. The equipment was sanitized according to method E.
4. Milk to be filtered was preheated by the procedure outlined in method A.
5. Milk was homogenized according to method B.
6. The startup procedure outlined in method G2 was conducted.
7. The milk was transferred from the surge tank to the cylindrical DMF at a desired flow rate.
8. The operating parameters were set using the guidelines in method G1.
9. Appropriate measurements were made.

Typically, the cylindrical DMF was operated at 5000 rpm, corresponding to a shear rate of about 10,000 sec$^{-1}$ in the filter. The feed temperature was 50° C. and the feed pressure varied from 1.3–2.0 bar. The filtrate to feed ratio was maintained at over 95% for each of these examples. The flux reported in table 2 is the steady state filtrate flux obtained, typically, fifteen minutes after start of filtration. The total time of the experiment varied in each case since the volume of milk filtered was a constant 30 liters.

Example Six

A 0.2 micron Ultipor N$_{66}$ ® membrane was used for this example. A feed rate of 250 ml/min was used to obtain a steady state filtrate flux of 330 L/hour/m$^2$. The filtration continued for about 130 minutes, at which time there was no more milk in the process vessel, without apparent decay in filtrate flux rates.

Example Seven

A 0.30 micron Ultipor N$_{66}$ ® membrane was used for this example. A feed rate of about 550 ml/min was used to obtain a steady state flux of 775 L/hour/m$^2$ for about 60 minutes, whereupon the experiment was terminated.

Example Eight

A 0.45 micron Ultipor N$_{66}$ ® membrane was used for this example. A feed rate of 740 ml/min was used to obtain a steady state flux of 1080 L/hour/m$^2$. The filtration continued for about 40 minutes without apparent decay in flux rates, whereupon the milk supply was exhausted and the experiment was terminated.

Example Nine

A 0.65 micron Ultipor N$_{66}$ ® membrane was used for this example. A feed rate of 1100 ml/min was used to obtain a steady state flux of 1680 L/hour/m$^2$. The filtration continued for about 30 minutes, whereupon the milk supply was exhausted and the experiment was terminated.

Examples 6–9 are summarized in table 2. The data shows that by using the filtration process of this invention, stable filtrate fluxes can be obtained using various grades of bacterially retentive membranes. The table shows that in the process of the present invention membranes with smaller pores and hence, increased bacterial retention, can be used at the expense of filtrate flux rates.

TABLE 2

Flux of milk using various membranes in the cylindrical DMF

| Example # | Fluid | Membrane | Pore size (micron) | RPM | Feed Temp (°C.) | Feed Press (Bar) | Filtrate/ Feed ratio | Expt. time (mins.) | Flux (L/hr/m$^2$) |
|---|---|---|---|---|---|---|---|---|---|
| 6 | skim milk | Ultipor N$_{66}$ ® | 0.20 | 5000 | 50 | 2.0 | 0.97 | 130 | 330 |
| 7 | skim milk | Ultipor N$_{66}$ ® | 0.30 | 5000 | 50 | 1.6 | 0.97 | 60 | 775 |
| 8 | skim milk | Ultipor N$_{66}$ ® | 0.45 | 5000 | 50 | 1.5 | 0.97 | 40 | 1080 |
| 9 | skim milk | Ultipor N$_{66}$ ® | 0.65 | 5000 | 50 | 1.3 | 0.97 | 30 | 1680 |

Example Ten

A 0.2 micron Posidyne ® membrane with a positive surface charge was used for this example. The membrane used has its pore surfaces populated by quaternary ammonium groups and has a high absorptive capacity for biological material.

A feed rate of 260 ml/min was used to obtain a steady state flux of 360 L/hour/m$^2$. The filtrate flux was in the same magnitude as obtained with uncharged membrane as described in example six. The filtration continued for about 120 minutes, at which time there was no more milk in the process vessel, without apparent decay in filtrate flux rates. A filtrate to feed ratio of above 97% was maintained throughout the experiment. Other experimental conditions are given in table 3.

It was expected that a large amount of proteins from milk would bind to the membrane surface ultimately plugging it. This example showed that under a dynamic mode a membrane that normally shows protein affinity performed well.

Example Eleven

A feed rate of 740 ml/min of whole milk was used, and a stable filtrate flux of 1130 L/hour/m$^2$ was obtained. Other experimental conditions are given in Table 3. The filtration continued for about 40 minutes, whereupon the milk supply was exhausted and the experiment was terminated.

This example shows that whole milk can be filtered using the process of this invention. The observed difference in filtrate fluxes between whole milk and skim milk (as in example 9) appears primarily to be due to the differences in their viscosities. The ratio of the filtrate flux achieved for whole milk to skim milk is approximately equal to the ratio of the viscosity of whole milk to skim milk.

TABLE 3

| Example # | Fluid | Membrane | Pore size (micron) | RPM | Feed Temp (°C.) | Feed Press (Bar) | Filtrate/ Feed ratio | Expt. time (mins.) | Flux (L/hr/m$^2$) |
|---|---|---|---|---|---|---|---|---|---|
| 10 | skim milk | Posidyne ® | 0.20 | 5000 | 50 | 2.0 | 0.97 | 120 | 360 |
| 11 | whole milk | Ultipor N$_{66}$ ® | 0.65 | 5000 | 50 | 1.4 | 0.93 | 40 | 1130 |

Examples Twelve to Sixteen

Examples for determining filtrate fluxes through various bacterially retentive membranes were repeated using the disc dynamic microfilter. The general procedures for examples twelve through sixteen are described below. The conditions described generally hold for each example unless specifically stated otherwise.

1. The desired membrane filter element was assembled in the disc DMF.
2. An integrity test as outlined in method F was conducted. The membrane filter element was rejected if it did not pass the test.
3. The equipment was sanitized according to method E.
4. Milk to be filtered was preheated by the procedure outlined in method A.
5. Milk was homogenized according to method B.
6. The general startup procedure outlined in method G2 was conducted.
7. The milk was transferred from the surge tank to the disc DMF at a desired flow rate.
8. Appropriate measurements were made.

Typically the disc DMF was maintained at 3500 rpm, corresponding to a calculated shear rate of about 200,000 sec$^{-1}$. The feed temperature was 50° C. and the feed pressure was maintained at about 0.2 bar. Milk was pumped into the filter at the rate of 960 ml/min in order to maintain a high crossflow velocity across the membrane. The filtrate to feed ratio was adjusted specially for the membrane pore size, feed temperature and rotor rpm. The unfiltered portion of the feed was recirculated into the process vessel. The flux reported in the table below is the steady state flux obtained through the membrane as filtrate, typically half an hour after start of filtration.

Example Twelve

A 0.2 micron Ultipor N$_{66}$ ® membrane was used for this example. A steady state filtrate flux of 850 L/hour/m$^2$ was obtained.

Example Thirteen

A 0.45 micron Ultipor N$_{66}$ ® membrane was used for this example. A steady state flux of 1600 L/hour/m$^2$ was obtained.

Example Fourteen

A 0.45 micron Posidyne ® membrane was used for this example. A steady state flux of 1600 L/hour/m$^2$ was obtained.

The data shown in table 4 summarizes examples 11–13. The data shows that by using the filtration process of this invention, stable filtrate fluxes can be obtained using various grades of bacterially retentive membranes, while using a disc DMF. The table shows that membranes with smaller pores and hence, increased bacterial retention (titer reduction) can be used in the present invention at the expense of filtrate flux rates.

TABLE 4

| Example # | Fluid | Membrane | Pore size (micron) | RPM | Feed Temp (°C.) | Feed Press (Bar) | Filtrate/ Feed ratio | Expt. time (mins.) | Flux (L/hr/m$^2$) |
|---|---|---|---|---|---|---|---|---|---|
| 12 | skim milk | Ultipor N$_{66}$ ® | 0.20 | 3500 | 50 | 0.2 | 0.22 | 137 | 850 |
| 13 | skim milk | Ultipor N$_{66}$ ® | 0.45 | 3500 | 50 | 0.2 | 0.37 | 80 | 1600 |
| 14 | skim milk | Posidyne ® | 0.45 | 3500 | 50 | 0.2 | 0.37 | 80 | 1600 |

Example Fifteen

Skim milk at 18° C. and homogenized by method B was pumped into a disc DMF equipped with a 0.45 micron Ultipor N$_{66}$ ® membrane. The filtration was performed at a feed rate of 860 ml/min, at which a steady state filtrate flux of about 860 L/hour/m$^2$ through the membrane was achieved. The filtered milk was measured at 25° C. Other conditions of this example are given in the table 5.

This example demonstrates that refrigerated skim milk, at about 18° C. can be processed by the method of the present invention through a bacterially retentive membrane. The reduced filtrate fluxes at this reduced temperature is believed to reflect the higher viscosity of milk at this temperature, compared to higher temperatures.

Example Sixteen

A disc DMF was equipped with a 0.45 micron Ultipor N$_{66}$ ® membrane. Whole milk was fed into the disc DMF at a rate of 900 ml/min and a steady-state filtrate flux of about 850 L/hour/m$^2$ through the membrane was achieved. The experiment was conducted without recycle of the unfiltered portion of the feed stream.

This example demonstrates that whole milk can be filtered by the method of the present invention, using a disc DMF. Skim milk under essentially identical conditions gave an approximate steady-state filtrate flux of about 1600 L/hour/m$^2$. The observed difference in filtrate flows between skim and whole milk, correspond approximately to the ratio differences in the fluid viscosities.

Example Seventeen

Using the methods described previously a filtration experiment was conducted on the disc DMF, while maintaining a high filtrate to feed ratio. A 0.45 micron Ultipor $N_{66}$® membrane was used in this experiment. Feed of skim milk was maintained at 115 ml/min and a rotational speed of 2100 rpm was used. A filtrate flux of 460 L/hour/$m^2$ was obtained.

TABLE 5

| Example # | Fluid | Membrane | Pore size (micron) | RPM | Feed Temp (°C.) | Feed Press (Bar) | Filtrate/Feed ratio | Expt. time (mins.) | Flux (L/hr/$m^2$) |
|---|---|---|---|---|---|---|---|---|---|
| 15 | skim milk | Ultipor $N_{66}$ ® | 0.45 | 3500 | 18 | 0.2 | 0.23 | 130 | 860 |
| 16 | whole milk | Ultipor $N_{66}$ ® | 0.45 | 3500 | 50 | 0.2 | 0.23 | 90 | 850 |
| 17 | skim milk | Ultipor $N_{66}$ ® | 0.45 | 2100 | 50 | 0.5 | 0.92 | 50 | 460 |

Example Eighteen

To demonstrate extended operation, an experiment was conducted with a large quantity (500 liters) of raw, unpasteurized, skim milk. The milk was preheated to 50° C. by passing it through a plate heat exchanger. It was then homogenized according to method B and then pumped into a cylindrical DMF equipped with a 0.65 micron membrane. Typically, the dynamic microfilter was maintained at 5000 rpm for this example. The feed pressure varied from 1.3–1.5 bar at a feed rate of about 1300 ml/min. The filtrate to feed ratio was maintained at over 95%. A steady state filtrate flux of about 1680 L/hour/$m^2$ was obtained. There was no decline in the flow of filtered milk nor was there any increase in feed pressure during the six hours of continuous operation required to process the 500 liters.

This example shows that it is possible to use the filtration process of this invention for extended periods of time.

Example Nineteen

This example demonstrates the ability of the method of the present invention to be used to filter milk, using a disc DMF, for the purpose of recovering proteins from the milk. Proteins in milk are generally in a size range from about 0.02 to about 0.30 micron (D. G. Schmidt, P. Walstra and W. Buchheim, Neth. Milk Dairy J. 27 (1973):128), making them susceptible to recovery in accordance with the process of the present invention. This is especially important for recovering biologically significant proteins from transgenic animals, such as transgenic cows, sheep, and the like that have been genetically altered to stimulate the production of such proteins, as in accordance with the techniques already known in the art.

A disc DMF was used that was equipped with a 0.2 micron nylon filter. The filtration of the milk was performed at a feed rate of 840 ml/min, at which a steady-state permeate flux of about 850 L/hour/$m^2$ through the membrane was achieved, at a rotor speed of 3500 rpm, with recycle of the retentate, the permeate being discarded in the present method. The feed, permeate and retentate were periodically sampled and then analyzed for total protein in accordance with the Kjeldhal method. It was determined that the protein content in the retentate initially was the same as that in the feed, but increased (4.9% retentate, 3.1% feed) with prolonged recirculation of the retentate.

Use of a smaller pore size membrane should provide even better concentration of protein into the concentrate stream.

Examples Twenty and Twenty-One

These examples were carried out to establish that no fractionation of the components in the milk, takes place during the filtration process of this invention. In these examples, samples of the feed, filtrate and concentrate were analyzed at various times during filtration to establish protein concentrations by the Kjedahl method and total solids by evaporation.

Example Twenty

Feed, filtrate and concentrate samples were taken at various times during the trial described in example eighteen and analyzed for total solids in each stream. The data in table 6 shows that there is no significant depletion of the total solids from the filtrate while using a 0.65 micron membrane.

Example Twenty-One

Feed, filtrate and concentrate samples were acquired at various times while executing example thirteen and analyzed for total solids and proteins in each stream. The data is shown in table 6. Once again there was no significant depletion of solids or proteins from the filtrate milk while using a 0.45 micron membrane.

TABLE 6

| Filtration mode | Membrane pore size (microns) | Proteins % | | | Total Solids % | | |
|---|---|---|---|---|---|---|---|
| | | Filtrate | Feed | Concentrate | Filtrate | Feed | Concentrate |
| Cylinder Example 20 | 0.65 | — | — | — | 9.14 | 9.17 | 9.35 |
| Disc Example 21 | 0.45 | 3.38 | 3.15 | 3.35 | 8.64 | 8.70 | 8.85 |

Experiment Twenty-Two to Twenty-Eight

Experiments twenty-two through twenty-eight were conducted to demonstrate the ability of the present invention to remove bacteria from milk. The general operating procedure was maintained the same as those for the experiments in examples six through eighteen, except that bacteria was added to the process stream by method C. The bacteria *E. coli*, commonly found in milk was used in these experiments for seeding, unless otherwise stated. Samples of feed, filtrate and bacterial concentrate were taken at various times during the filtration, using sterile techniques. These samples were assayed for bacteria by using the procedure outlined in method D and results are reported in table 7.

As shown in that table, the present invention is capable of achieving dramatic reductions in the bacteria content of milk. The high removal rate for *E. coli* is directly translatable to a high removal of *Bacillus cereus* bacteria, which cannot be completely removed using conventional pasteurization. *E. coli* is known to have a rod-like structure, with dimension of about 1.1 to 1.5 $\mu$m by 2 to 6 $\mu$m, whereas Bacillus bacteria such as *Bacillus cereus* have similar dimension, and also have rod-like structures, with dimensions of about 1.0 to 1.2 $\mu$m by 3 to 5 $\mu$m. Thus, the ability to remove *E. coli*, as shown in table 7, also means that the process is capable of removing the very undesirable *Bacillus cereus* bacteria, resulting in milk with a very long storage life, even at room temperature.

Example Twenty-Two, Twenty-Three and Twenty-Four

Examples six, eight and nine were repeated except that *E. coli* was introduced in the process stream by method C. Samples of feed, filtrate and concentrate were taken for bacterial analysis. The titer reduction data is shown in the table 7.

Example Twenty-Five

Example thirteen was repeated, except that bacteria was introduced into the feed stream by method C and the bacterial concentrate was not recycled back into the process vessel. A steady state milk flux of about 1600 L/hour/m$^2$ was achieved. The microbiological data is shown in table 7.

The filtered milk contained only very low levels of 7 to 10 bacteria per ml of milk, dramatically lower than the feed levels of 10$^6$ per ml. The titer reduction in this case was greater than 10$^5$. As a comparison, during conventional pasteurization of milk, titer reductions of only about 10$^2$ to 10$^3$ are achieved.

Example Twenty-Six

The experimental conditions and procedures of example twelve were repeated in this experiment, except that *E. coli* was added into the feed stream by method C and the concentrate was not recycled into the process vessel. A steady state milk flux of about 850 L/hour/m$^2$ was achieved. Samples of feed, filtrate and concentrate were taken for bacterial analysis. The data shown in the table 7 shows a titer reduction of greater than 10$^6$. Sterile milk was produced since no bacteria was detected in the filtered milk.

This example demonstrates the ability of the method of the present invention to essentially completely remove bacteria from milk, using a disc DMF and an appropriately chosen membrane. Thus sterile milk can be produced.

Example Twenty-Seven

Unpasteurized raw milk contains a wide variety of organisms including coliforms like *E. coli* and pathogens like listeria and campylobacteria, and *Bacillus cereus* bacteria. In this example no external bacterial seeding of the raw milk was done, rather the milk was tested for the inherent or "native" bacteria.

Samples of feed, filtrate and concentrate were taken for bacterial analysis, during the execution of experiment eighteen and were analyzed for native bacteria by method D.

Only 14 bacteria per ml were found in the filtrate. The feed had 2500 bacteria per ml and the concentrate had 2×10$^4$ bacteria per ml. Further, no psychrophilic bacteria were detected in the filtrate. Psychrophilic bacteria are those that grow at cold temperatures and cause the spoilage of refrigerated milk.

Table 7 summarizes experiments 22 through 27. The data shows that in both the cylinder and disc modes increased titer reduction is gained at the expense of filtrate flux. The table also shows that by choosing the correct membrane it is possible to get sterile milk filtrate.

TABLE 7

| Example # | Pore Size micron | Membrane type | Avg. Flux L/m$^2$/hr | Feed Temp °C. | Operating Pressure Bar | Feed Conc. Bacteria/ml | % Bacteria Removal | Titer Reduction $T_R$ |
|---|---|---|---|---|---|---|---|---|
| 22 | 0.2 cylinder | Ultipor N$_{66}$ ® | 330 | 50 | 2.0 | 10$^6$ (E. coli) | 99.9992% | 10$^6$ |
| 23 | 0.45 cylinder | Ultipor N$_{66}$ ® | 1080 | 50 | 1.5 | 10$^6$ (E. coli) | 99.992% | 4 × 10$^5$ |
| 24 | 0.65 cylinder | Ultipor N$_{66}$ ® | 1680 | 50 | 1.3 | 10$^6$ (E. coli) | 99.96% | 4 × 10$^2$ |
| 25 | 0.45 disc | Ultipor N$_{66}$ ® | 1600 | 50 | 0.2 | 10$^6$ (E. coli) | 99.9995% | 8 × 10$^5$ |
| 26 | 0.2 disc | Ultipor N$_{66}$ ® | 850 | 50 | 0.2 | 10$^6$ (E. coli) | 100.00% | >10$^6$ |
| 27 | 0.65 cylinder | Ultipor N$_{66}$ ® | 1680 | 50 | 1.3 | 10$^3$ (Native) | 99.44% | 2 × 10$^2$ |

Example Twenty-Eight

Apart from the bacteria (*E. coli*) tested for titer reduction, there are pathogenic organisms in milk like listeria, which are of real practical concern in the dairy industry. These pathogens provide a more severe challenge than the coliforms (*E. coli*) that have also been tested in the dynamic filter. Tests were conducted by the methods outlined in method D to see if the membrane filter elements used would efficiently remove these pathogens. This test was conducted on an off-line test rig and not on the dynamic filter.

The data shown in table 8 clearly shows that a 0.45 $\mu$m Ultipor N$_{66}$ ® membrane with a specific bubble point (ASTM F316-86) will provide absolute removal of listeria.

TABLE 8

Titer reductions of pathogenic organism found in milk using Pall membranes

| Membrane | Bubble point | Total Challenge of Listeria bacteria/ml | Filtrate bacteria/ml | Titer Reduction $T_R$ |
|---|---|---|---|---|
| 0.45 μm, Ulitpor $N_{66}$ ® | 24 psi | $7.10 \times 10^7$ | 0 | $>5 \times 10^6$ |
| 0.45 μm, Ultipor $N_{66}$ ® | 22 psi | $6.6 \times 10^7$ | 1 | $4.7 \times 10^6$ |
| 0.65 μm, Ultipor $N_{66}$ ® | 16.5 psi | $7.10 \times 10^7$ | $7.5 \times 10^3$ | $6.8 \times 10^2$ |

Example Twenty-Nine

Filtered skim milk produced by the method of Example Sixteen is collected in a sanitized container.

Commercially available cream, is heated to 65° C. and filtered through a 0.2 micron Ultipor $N_{66}$® filtration cartridge, available from Pall Corporation, East Hills, N.Y., with a minimum titer reduction of $10^6$ with E-Coli bacteria. The filtered cream is substantially depleted of bacteria and is collected in a sanitized container.

The filtered skim milk and the filtered cream are then mixed and homogenized to attain a 2% fat milk with lowered bacterial content.

What is claimed is:

1. A method for treating raw milk to produce treated milk having a lower bacterial content than the raw milk, comprising (1) separating said milk into a fat fraction with a minimum fat content of about 10% and a skim milk fraction, (2) homogenizing the skim milk fraction and within about 5 minutes from the homogenization, subjecting the skim milk fraction to dynamic microfiltration by passing the skim milk fraction through a microfilter having an average pore size sufficient to reduce the bacterial content of the milk flowing therethrough, to yield a filtrate which has a lower bacterial content than the initial skim milk fraction and a concentrate having a higher bacterial content than the initial skim milk fraction, (3) separately reducing the bacterial content of the fat fraction, and (4) subsequently combining the skim milk fraction after microfiltration and the fat fraction having the lowered bacterial content.

2. The method according to claim 1 wherein the bacterial content of the fat fraction is reduced by dynamic microfiltration.

3. The method according to claim 1 wherein the bacterial content of the fat fraction is reduced by pasteurization.

4. A method for making milk having a fat content of about 2%, comprising (1) homogenizing a skim milk fraction and within about 5 minutes from the homogenization, (2) subjecting the skim milk fraction to dynamic microfiltration by passing the skim milk fraction through a microfilter having an average pore size sufficient to reduce the bacterial content of the milk flowing therethrough, to yield a filtrate which has a lower bacterial content than the initial skim milk fraction and a concentrate having a higher bacterial content than the initial skim milk fraction, (3) reducing the bacterial content of a cream fraction having a minimum fat content of about 10%, and (4) subsequently combining the skim milk fraction after microfiltration and the cream fraction having the lowered bacterial content.

5. In a method for treating raw milk to produce treated milk having a lowered bacterial content, by passing said raw milk through a microfilter having an average pore size sufficient to reduce the bacterial content of the milk flowing therethrough, to yield a filtrate which has a lower bacterial content than the raw milk and a concentrate having a higher bacterial content than the raw milk, the improvement comprising homogenizing the raw milk within about 5 minutes or less, prior to filtering said raw milk.

* * * * *